(12) United States Patent
Miyazaki et al.

(10) Patent No.: US 6,245,306 B1
(45) Date of Patent: *Jun. 12, 2001

(54) METHOD FOR PURIFICATION OF EXHAUST GAS

(75) Inventors: Tatsuro Miyazaki, Fukuoka; Nobuyuki Tokubuchi, Saga; Mashaaki Arita, Onojo; Masahiro Inoue, Kasuga; Kensei Fukuda, Saga-ken; Shouji Kuroda, Kasuga; Shoichi Shimizu, Fukuoka; Kazuhiko Noda, Chikushino, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/890,200

(22) Filed: Jul. 9, 1997

Related U.S. Application Data

(63) Continuation of application No. 08/355,330, filed on Dec. 12, 1994, now abandoned.

(30) Foreign Application Priority Data

Dec. 17, 1993 (JP) .................................................. 5-318217
Apr. 22, 1994 (JP) .................................................. 6-084537

(51) Int. Cl.[7] .............................. B01D 45/00; B01J 8/02; C01B 21/00; C01B 23/00
(52) U.S. Cl. .................................. 423/215.5; 423/213.5; 502/525; 55/DIG. 30
(58) Field of Search .............................. 423/215.5, 213.5; 55/DIG. 30; 502/525

(56) References Cited

U.S. PATENT DOCUMENTS 4,386,497 * 6/1983 Takagi et al. .................. 55/DIG. 30
4,451,441 * 5/1984 Ernest et al. ..................... 423/215.5

(List continued on next page.)

FOREIGN PATENT DOCUMENTS

| 0105113A2 | 4/1984 | (EP) . |
| 0154145A2 | 9/1985 | (EP) . |
| 0291704A1 | 11/1988 | (EP) . |
| 0336883A1 | 10/1989 | (EP) . |
| 0485974A1 | 5/1992 | (EP) . |
| 63-49216 * | 3/1988 | (JP) . |
| 5155626A | 6/1993 | (JP) . |
| 92-01505 * | 2/1992 | (WO) . |

OTHER PUBLICATIONS

Database WPI, Derwent Publications Ltd., London, GB; AN 92–188534 & JP–A–04 122 448 (Matsushita Elec. Ind. Co.), Apr. 22, 1992.
Database WPI, Derwent Publications Ltd., London, GB; AN 88–004585 & JP–A–62 269 747 (Toyota), Nov. 24, 1987.
Official Translation of Kudo, Japan Kokai 63–49,216, first published Mar. 2, 1988.*
Official Translation of Monceaux, PCT Publication WO92/01505, Feb. 6, 1992.*

*Primary Examiner*—Steven P. Griffin
*Assistant Examiner*—Jonas N. Strickland
(74) *Attorney, Agent, or Firm*—Stevens, Davis, Miller & Mosher, LLP

(57) ABSTRACT

The particulates, etc. deposited on the trap are burnt in such a manner that the trap is heated so that the temperature of the trap does not exceed 500° C. or the maximum temperature gradient in radial direction of the trap is 20° C./mm or less, preferably 10° C./mm or less.

19 Claims, 6 Drawing Sheets

U.S. PATENT DOCUMENTS

| | | | |
|---|---|---|---|
| 4,515,758 | * | 5/1985 | Domesle et al. .................. 423/215.5 |
| 4,535,589 | * | 8/1985 | Yoshida et al. ................. 55/DIG. 30 |
| 4,711,870 | * | 12/1987 | Yamada et al. ................... 423/215.5 |
| 4,900,517 | * | 2/1990 | Domesle et al. .................. 423/215.5 |
| 4,929,581 | * | 5/1990 | Steinwandel ...................... 423/213.5 |
| 4,935,042 | * | 6/1990 | Sudo et al. ............................. 60/311 |
| 5,028,405 | * | 7/1991 | Erdmannsdoefer ............... 423/215.5 |
| 5,074,112 | * | 12/1991 | Walton .................................... 60/275 |
| 5,171,335 | * | 12/1992 | Kojima .......................... 55/DIG. 30 |
| 5,180,559 | * | 1/1993 | Ma ....................................... 423/212 |
| 5,194,078 | * | 3/1993 | Yonemura et al. ............. 55/DIG. 30 |
| 5,458,665 | * | 10/1995 | Ishii et al. ............................... 55/282 |
| 5,622,680 | * | 4/1997 | Monceaux et al. ............... 423/213.5 |

* cited by examiner

F I G . 4
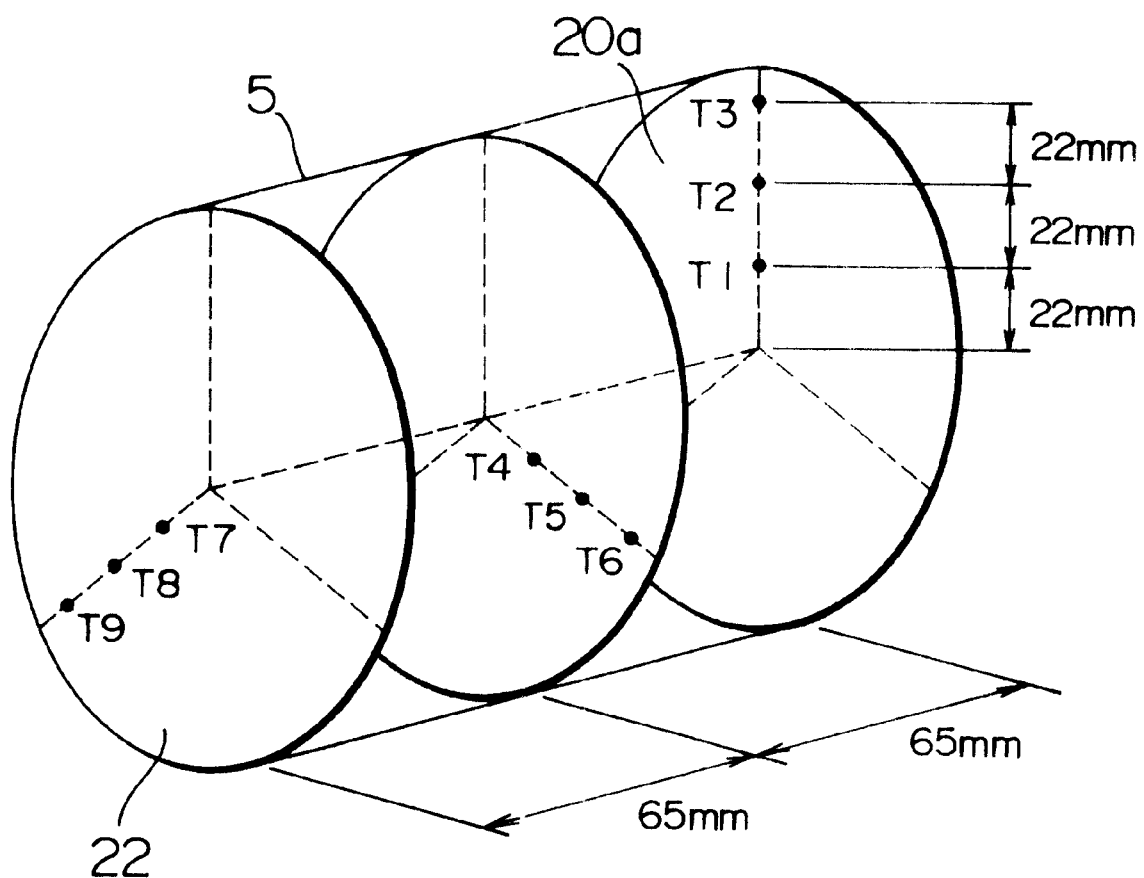

METHOD FOR PURIFICATION OF EXHAUST GAS

This application is a continuation of application Ser. No. 08/355,330, filed Dec. 12, 1994 (abandoned).

BACKGROUND OF THE INVENTION

The present invention relates to a method for purification of an exhaust gas, particularly an exhaust gas from diesel engines and an apparatus for purification of an exhaust gas.

Unburnt particulate substances in an exhaust gas from diesel engines, for example, solid carbon fine particles, liquid or solid high molecular weight hydrocarbon fine particles and the like (hereinafter referred to as "particulates") mostly have a particle size of smaller than 1 micron and are apt to float in the atmosphere and to be breathed into human bodies. Furthermore, since they contain carcinogenic substances, especially recently many problems are taken up in Japan and abroad and it is supposed that control of exhaustion be further tightened in the future.

Diesel exhaust gases contain NOx which is a harmful substance, in addition to the above-mentioned particulates and this substance is also regulated on its exhaustion. Production of NOx and the particulates are in the relation of trade-off, and there is the tendency that when a measure is taken to diminish emission of NOx, emission of particulates increases. Therefore, it is difficult to diminish both the NOx and the particulates only by the improvement of the operating system of engines, and removal of the particulates is carried out by physical trapping of them by a particulate trap provided in an exhaust gas line. However, when the trap is used for a long time, the trap is clogged with deposited particulates to result in pressure loss. Under the circumstance, as a promising method, it has been studied to periodically burn the trapped particulates and regenerate the trap.

The particulates contained in diesel exhaust gases comprise liquid or solid high molecular weight fine particles of a relatively low ignition temperature and solid carbon fine particles of a relatively high ignition temperature, and since the proportion of them varies depending on exhausting conditions (kinds of engines, operating modes, etc.), the ignition temperature of the particulates differs and, moreover, the ignition temperature of the solid carbon fine particles and liquid or solid high molecular hydrocarbon fine particles per se also differs depending on the exhausting conditions. However, in general, in order to burn and remove the particulates trapped in the trap to inhibit the pressure loss in the exhaust gas line, the trap and the trapped particulates must be heated to a high temperature (600–700° C.) and this brings about the following problems.

(1) It is necessary for regeneration of the trap to keep the trap at a high temperature for ignition of the particulates, and this heat and the heat of combustion of the particulates after ignition cause increase in the temperature of the trap part, so that materials constituting the trap are molten and damaged.

(2) In regeneration of the trap, a heat source is supplied from one side of the trap but, since as mentioned above, the ignition temperature is high and the heat of combustion of the particulates is added thereto, a thermal stress in the trap increases due to the difference in the temperature between the ignited part and the unignited part, so that cracking occurs in the trap.

SUMMARY OF THE INVENTION

The object of the present invention is to provide a method for purification of exhaust gases and an apparatus for purification of exhaust gases in which no melting loss, cracking or breaking of the trap is caused, which are industrially useful.

BRIEF DESCRIPTION OF THE DRAWINGS

FIG. 4 is a comprehensive view of an experiment which conducted measurement of the temperature gradient of the trap.

DETAILED DESCRIPTION OF THE INVENTION

The present invention will be illustrated with reference to the following examples.

Figure 1:
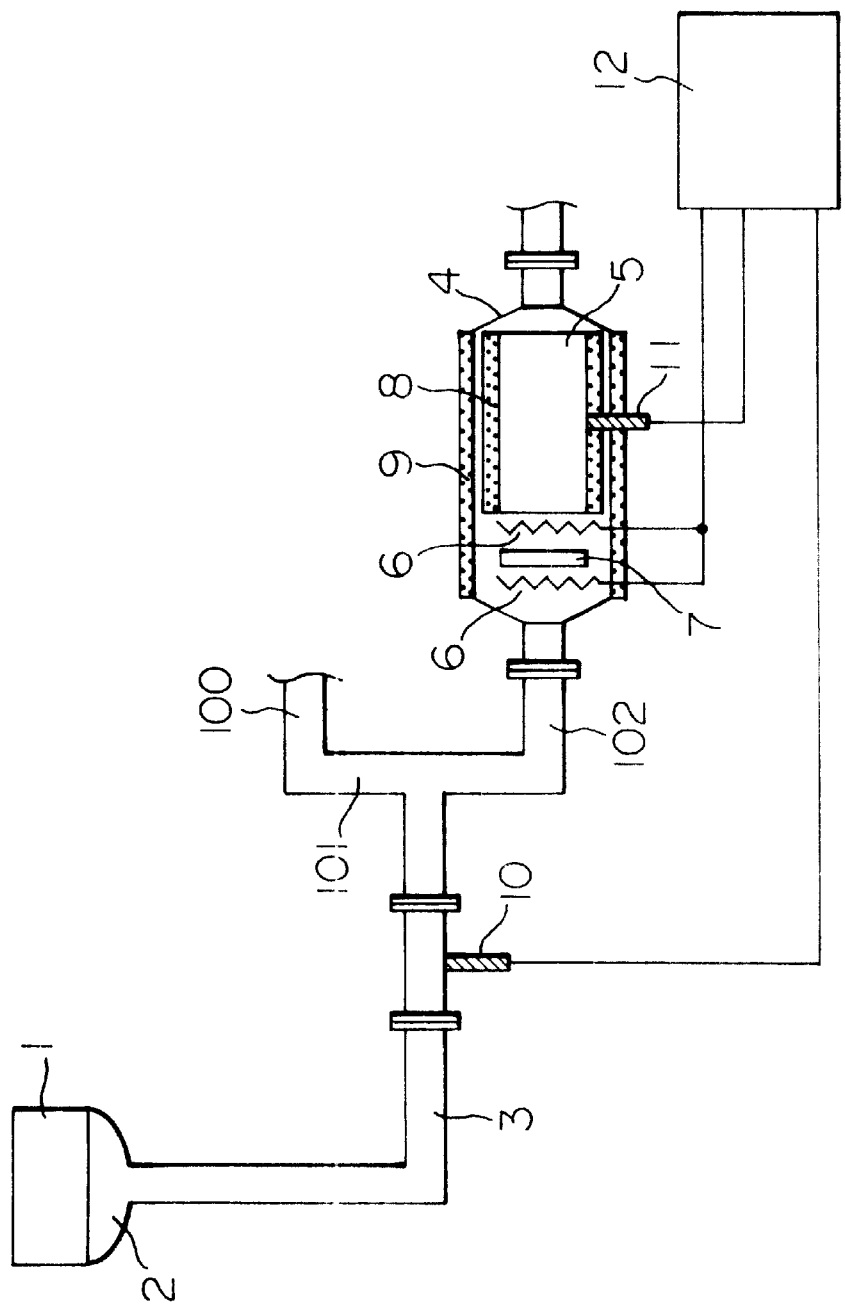
FIG. 1 is a schematical view of an apparatus for purification of exhaust gases according to one example of the present invention.

FIG. 1 is a schematic view of an apparatus for purification of exhaust gases according to one example of the present invention and FIG. 1 shows, for example, an apparatus for purification of exhaust gases from a diesel engine.

In FIG. 1, 1 indicates a diesel engine body, 2 indicates an exhaust manifold connected to the diesel engine body 1, 3 indicates an exhaust tube connected to the exhaust manifold 2, and 4 indicates a trap container connected to the exhaust tube 3. The exhaust gas exhausted from the diesel engine body 1 is led to the trap container 4 made of a heat-resistant material from the exhaust manifold 2 through the exhaust tube 3.

The trap container 4 contains trap 5 for rapping the particulates, etc., a pair of electric eaters 6, and two-dimensional component 7 provided on the exhaust gas inlet side of the trap container 4 and put between a pair of the electric heaters 6. Furthermore, heat insulating material 8 is provided at the outer sidewall of the trap 5. Occasionally, heat insulating material 9 is also provided at the outer sidewall of the trap container 4 for giving further heat insulating action as shown in FIG. 1. These heat insulating materials 8 and 9 are made of, for example, ceramic fibers, etc.

As the trap 5, for example, a heat-resistant ceramic fired body and metallic porous body or metallic cotton-like body can be used and moreover, particles molded to a suitable size and packed in the trap container 4 may also be used. Use of the heat-resistant ceramic fired body is preferred because of its high endurance against corrosive gases such as SOx contained in the exhaust gases and use of the metallic cotton-like material is preferred because of its high heat conductivity.

The specific materials constituting the trap 5 include, for example, ceramics such as alumina, mullite, cordierite, silicon carbide and titanium oxide, and metallic materials such as SUS-42, SUS-43, SUS-301S and Inconel.

Furthermore, the burning temperature of the particulates can be lowered by supporting on trap 5 an oxidizing catalyst effective for burning of the particulates.

Figure 2:
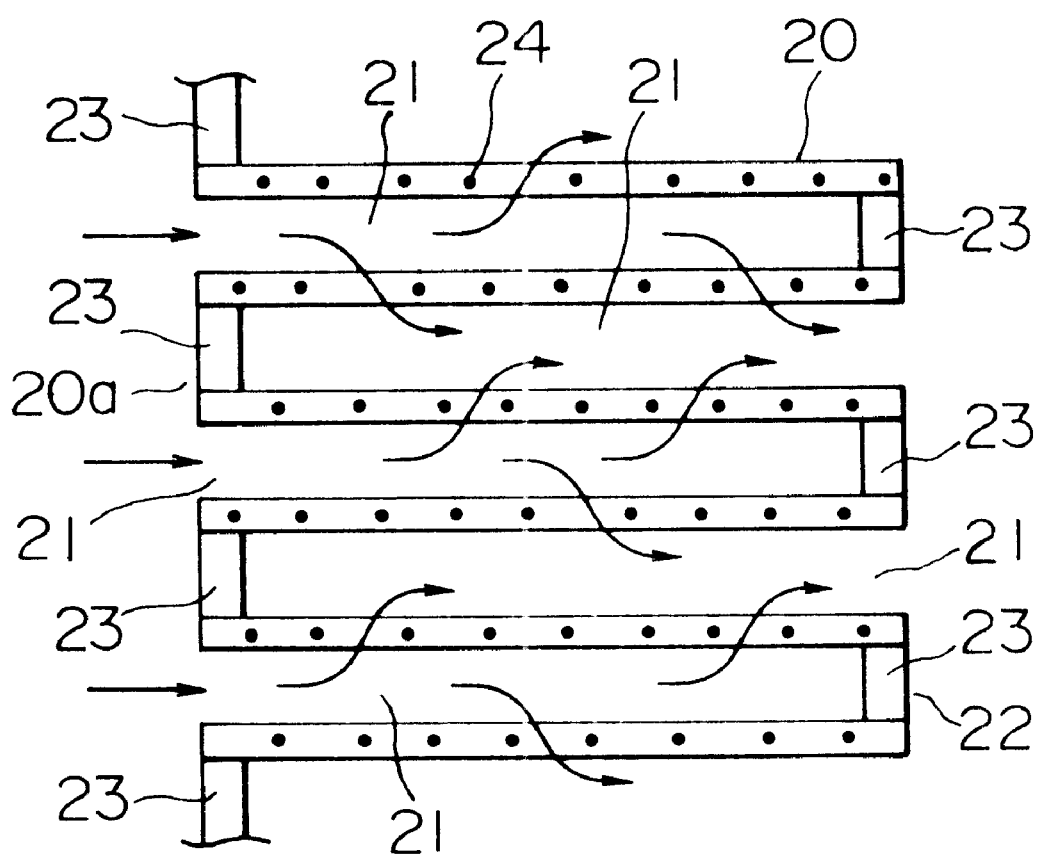
FIG. 2 is a side sectional view of a trap of an apparatus for purification of exhaust gases according to one example of the present invention.

Trap 5 will be explained specifically. As shown, for example, in FIG. 2, the trap 5 made of ceramics, etc. is constructed of a honeycomb component 20 having a plurality of through-holes 21 extending in one direction, in which the openings of an exhaust gas inlet face 20a and an exhaust gas outlet face 22 are alternately stopped with plugs 23. Moreover, the honeycomb component 20 is provided with oxidizing catalyst 24. As the oxidizing catalyst 24, there may be used noble metals such as Pt and Rh effective for burning of the liquid or solid high molecular weight hydrocarbon particles, oxides of metals such as Cu and V effective for burning of the solid carbon particles, or composite oxides comprising perovskite type oxides such as $LaMnO_3$ and $LaCrO_3$, a part of which is replaced with alkali metals or alkaline earth metals such as Sr, K and Li. These catalyst materials may be used alone or in admixture of two or more. In this example, the oxidizing catalyst 24 is provided for lowering the burning temperature of particulates, but it may not be provided depending on the construction and kind of the apparatus. However, preferably the oxidizing catalyst 24 is provided for prolongation of life of the apparatus and for saving of energy. In the thus constructed trap 5, when an exhaust gas enters from the inlet face 20a, the exhaust gas passes along the wall surface of the honeycomb component 20 and the particulates in the exhaust gas are trapped by the honeycomb component 20.

The large particles (agglomerated particles) in the exhaust gas are made finer (disintegration of particles) by the two-dimensional component 7. As the two-dimensional component 7, there may be used, for example, a reticulated plate-like component or a plate-like component having a plurality of through-holes. The materials used for the two-dimensional component 7 include ceramics such as alumina, mullite, cordierite, silicon carbide, lanthanum chromite composite oxide and titanium oxide and metals such as Fe—Cr—Al alloys (such as SUS-42, SUS-43 and SUS-301S) and Inconel.

The two-dimensional component 7 traps large particles contained in the exhaust gas by the fine holes and the trapped large particles are finely crushed by the force generated due to the difference in pressure between the exhaust gas inlet face and outlet face to produce fine particles. The resulting fine particles are led to the trap 5 from the two-dimensional component 7 and trapped by the trap 5. In addition to the production of fine particles by the physical crushing mentioned above, an oxidizing catalyst is supported on the two-dimensional component 7 and the trapped large particles are burnt to some extent, thereby fining the large particles to produce fine particles. Furthermore, the two-dimensional component 7 may comprise a plurality of the components which are laminated. In this case, the respective components differ in their mesh size and the mesh size of the component decreases from the exhaust gas inlet side to the outlet side. In the case of supporting an oxidizing catalyst on the two-dimensional component 7, the two-dimensional component 7 per se may generate heat by passing an electric current therethrough for improving the activity of the supported oxidizing catalyst.

In this example, the electric heater 6 is provided on the inlet side of exhaust gas, but the heater 6 may be wound round the sidewall of the trap 5 or may be inserted in the trap 5. Moreover, in this example, the electric heater 6 is used as a heating means, but a burner or a hot air generater may be used. As the electric heater 6, a sheathed heater, a micro-heater, and ceramic heater (for example, using silicon carbide or a lanthanum chromite composite oxide) can also be used.

Numeral 10 indicates a pressure sensor which detects the pressure of the exhaust gas in the exhaust tube 3 and as the pressure sensor 10, there may be used, for example, a sensor which outputs a signal having a level which rises in proportion to the pressure. Numeral 11 indicates a temperature sensor which detects the temperature of trap 5 and as the temperature sensor 11, there may be used a sensor which outputs a signal having a level which rises in proportion to the temperature.

Numeral 12 indicates a controller and this supplies an electric power to the electric heater 6 when the output levels of the pressure sensor 10 and the temperature sensor 11 are input therein.

Operation of the controller 12 will be explained using FIG. 3.

Figure 3:
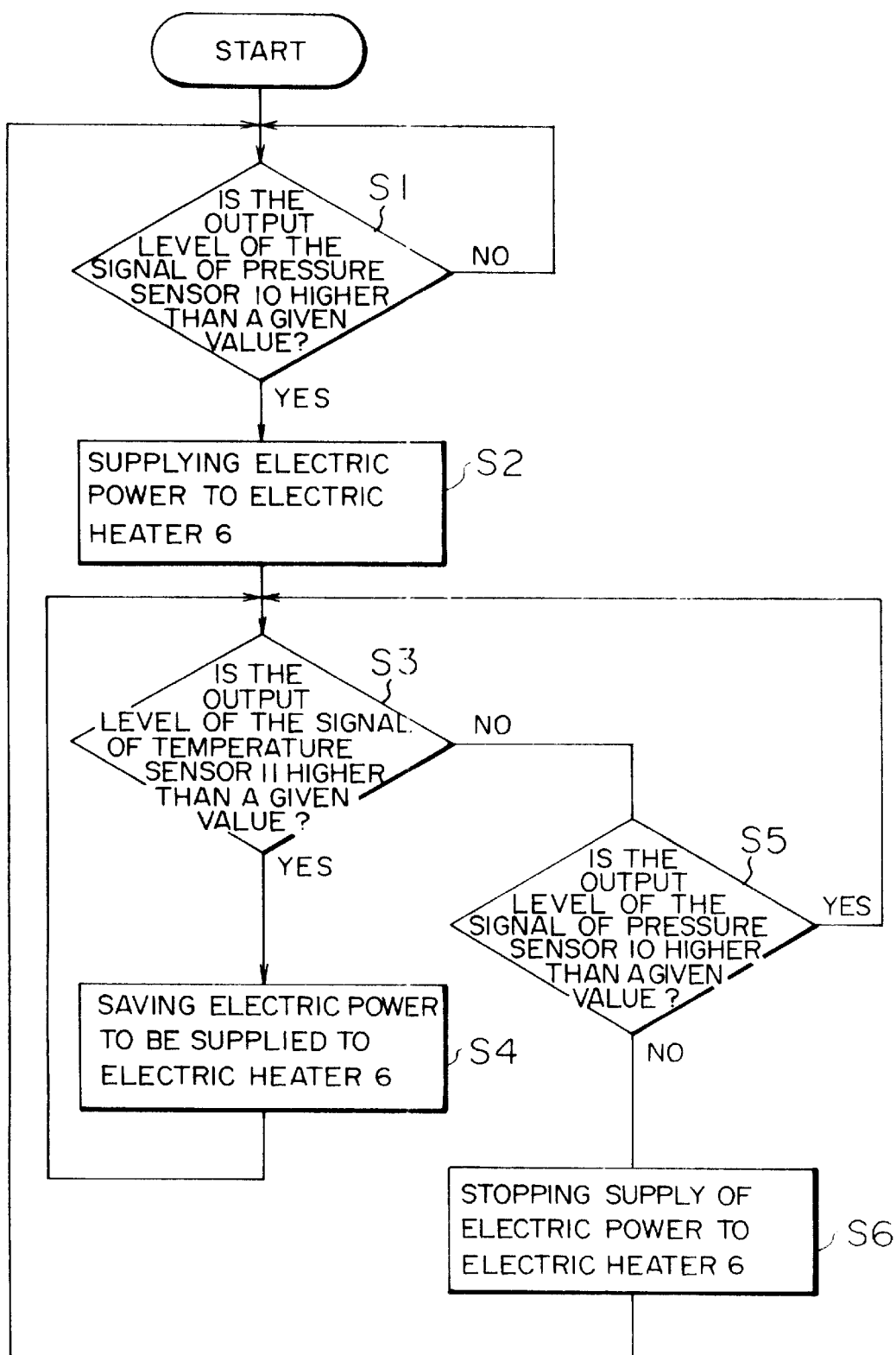
FIG. 3 is a flow chart which shows operation of a controller of an apparatus for purification of exhaust gases according to one example of the present invention.

FIG. 3 is a flow chart which shows a part of the process conducted by the controller 12.

First, the controller 12 monitors the output level provided from the pressure sensor 10 at the step (hereinafter referred to as "S") 1 and when the output level reaches higher than a given value, the operation moves to S2 and if the output is lower than a given value, it returns to S1. In this case, since the given value varies depending on engine characteristics or characteristics of the exhaust gas filter, it must be suitably selected. The reason for measuring the pressure of exhaust tube 3 is that when particulates are trapped by the trap 5, the pressure of the exhaust gas in the exhaust tube 3 increases and by measuring the pressure, the degree of clogging of trap 5 can be known.

Next, upon detecting that the pressure in the exhaust tube 3 is higher than a given value, the controller 12 supplies an electric power to the electric heater 6 to heat the two-dimensional component 7 and the trap 5, thereby burning the particulates accumulated in the two-dimensional component 7 and the trap 5 (S2).

Then, the output level of the temperature sensor 11 is monitored at S3 and when the output level is higher than a given value, the operation proceeds to S4 and when the output level is lower than a given value, it proceeds to S5. In this example, the given value shows a value corresponding to 500° C. At S4, the electric power to be supplied to the electric heater 6 is saved (the controller 12 reduces the electric power to be supplied to the electric heater 6) and the operation returns to S3. Whether the output level of the pressure sensor 10 is higher than the given value or not is monitored at S5 and when it is lower than the given value, the operation proceeds to S6 and when it is higher than the given value, the operation returns to S3.

Supply of the electric power to the electric heater 6 is stopped at S6 and the operation returns to The above operation will be explained specifically.

First, the particulates which deposit on trap 5 are burnt by supplying electric power to the electric heater 6 and the temperature of the trap 5 rises. The temperature of the trap 5 during the burning is controlled not to exceed 500° C. Conventionally, since the particulates in the trap are burnt merely by supplying a given electric power to the electric heater, the temperature of the trap sometimes rises to higher than 700° C. and causes cracking. On the other hand, in this example, since the electric power to be supplied to the electric heater 6 is controlled so that the temperature of the trap 5 is lower than 500° C. during the burning of particulates, no cracks of the trap 5 occur. In this example, the temperature of the trap 5 during the burning is controlled to lower than 500° C. by controlling the electric power to be supplied to the electric heater 6, but other means such as a cooling means may be employed.

Furthermore, in this example, the particulates deposited on the trap 5 are burnt simultaneously with operation of the engine. However, as shown in FIG. 1, a passage selecting means which feeds the exhaust gas to one of passage 102 or 100 (usually, the same exhaust gas purifying apparatus as provided at the end of the passage 102 is provided at the end of the passage 100, not shown) is provided at branching portion 101 and, for example, if the passage selecting means has initially made a selection so that the exhaust gas flows through the passage 102, the passage selecting means will cause the exhaust gas flow through the passage 100, when the trap 5 is clogged, thereby causing the pressure in the exhaust tube 3 increase. In this case, the exhaust gas flows into the exhaust gas purifying apparatus provided at the end of the passage 100 and removal of the particulates is performed. Furthermore, the exhaust gas purifying apparatus provided at the end of the passage 102 is controlled so that the burning temperature of trap 5 does not exceed 500° C., to thereby remove the particulates deposited on the trap 5. Similarly, when the exhaust gas has passed through passage 100, the passage selecting means directs the exhaust gas into passage 102 when the trap 5 is clogged, thereby causing the pressure in the exhaust tube 3 increase.

As mentioned above, the exhaust gas can be continuously purified by alternately carrying out regeneration of trap 5 and burning of trap 5.

Because the temperature of trap 5 is controlled not to exceed 500° C. in burning the particulates deposited on the trap 5 by adjusting the electric power supplied to the electric heater 6, the probability of occurrence of cracks and breaking of the trap 5 is markedly diminished.

Specific experimental examples will be recited below.

The respective members were prepared in the following manner.

The honeycomb component 20 was prepared by molding an alumina-silica ceramic fiber ($Al_2O_3/SiO_2$=47.3/52.3) and a sericite clay ($K_2O/Al_2O_3/SiO_2$=1/5/18) by a paper making process, laminating the resulting sheets to make a corrugated honeycomb structure and firing it at 1250° C. for 2 hours in the air.

As the catalysts supported on the honeycomb component 20, the following three catalysts were used: A ($Pt/\gamma-Al_2O_3$), B ($LaSrCoO_3$) and C ($LaCrLiO_3$).

As for the catalyst A, a commercially available $\gamma-Al_2O_3$ (specific surface area: 120 $m^2/g$) was disintegrated into particles in the wet state to obtain a slurry. The honeycomb component 20 was dipped in the slurry. The excess slurry was removed and the component was dried and fired to obtain a three-dimensional component coated with alumina. A hexachloroplatinate was dissolved in distilled water so that the amount of the hexachloroplatinate was 0.6 wt % based on $\gamma-Al_2O_3$. The three-dimensional component coated with alumina was dipped in the solution to chemically adsorb Pt to the alumina coat layer by ion exchange. The solvent was evaporated and the three-dimensional component was fired at 550° C. for 1 hour in hydrogen to obtain trap 5.

As for the catalyst B, lanthanum acetate, strontium acetate and chromium nitrate were weighed at a molar ratio of the metals of 0.8:0.2:1.0 and each was dissolved in a warm water of about 60° C. to prepare an aqueous solution. Then, water in the resulting aqueous solution was evaporated by a rotary evaporator to concentrate the metal salt, which was then dried and solidified on a hot plate to prepare a catalyst precursor. This precursor was calcined at 400–500° C. for 2 hours and rotated in a ball mill for 4 hours in the dry state, whereby agglomerates were ground and mixed. The mixture was fired at 900° C. for 5 hours in the air to prepare the desired composite oxide fine powder. Then, 30 wt % of the resulting composite oxide was added to an aqueous solution containing ammonium polycarboxylate in an amount of 0.4 wt % based on the composite oxide as a dispersant, followed by mixing and dispersing for 15 hours in a ball mill to prepare a slurry of the composite oxide powder. Another aqueous solution of ammonium polycarboxylate of the same concentration as that of the slurry was prepared and the slurry was diluted with this solution. The honeycomb component 20 was immersed in the diluted slurry, then, dried at 120° C. for a whole day and night and fired at 800° C. for 20 minutes in the air to obtain trap 5.

As for the catalyst C, lanthanum acetate, chromium nitrate and lithium acetate were weighed at a molar ratio of the metals of 1.0:0.6:0.4. Then, trap 5 was prepared in the same manner as in preparation of trap 5 using the catalyst B.

The two-dimensional component 7 was prepared using a reticulated Fe—Cr—Al alloy as a main material.

As the electric heater 6, a normal sheathed heater was used and it was provided at a distance of 5 mm from the end of the trap 5.

As the heat insulating material 8, a commercially available heat-expandable ceramics (e.g., Intaram Mat manufactured by Sumitomo 3M Co., Ltd.) comprising a ceramic fiber and a heat-expanding agent (such as vermiculite) was used and as the heat insulating material 9, a general ceramics insulating material was used.

As the trap container 4, a heat-resistant metal (SUS-301S) was used.

In this way, traps 5 on which catalysts A, B and C were supported, and trap 5 on which no catalyst was supported were prepared. In the apparatus on which the trap 5 was mounted, the ignition temperature of the particulates was measured and, furthermore, the controlling temperature of the trap 5 during the burning was set. For each sample, the degree of cracking of the trap 5 was examined. Furthermore, the existence of particles, such as the particulates, remaining was observed.

The ignition temperature of the particles at the time of regeneration was determined by analyzing the after-stream gas collected from trap 5 using a gas analyzer (a sensor for oxygen, carbon monoxide and carbon dioxide).

The presence or absence of remaining particles was determined by the change in weight before and after collecting the gas, and by measuring the amount of oxygen consumed and the amount of carbon monoxide and carbon dioxide generated with the above-mentioned gas analyzer.

The diesel engine was operated for 30 minutes with 3000 cc, at a rotation number of 1200 rpm and a torque of 20 kgm and the collection of gas was conducted until the back pressure reached 400 mmaq.

The presence or absence of cracks of trap 5 was judged by examining the presence of particulates exhausted from trap 5 using a smoke meter provided at the after-stream of trap 5.

The results are shown in Table 1.

TABLE 1

|  | Ignition temperature (° C.) | Controlled temperature (° C.) | Cracks | Remaining particulates |
|---|---|---|---|---|
| No catalyst | 610 | 620 | Occurred | None |
| No catalyst | 610 | 500 | Not occurred | Present |
| Catalyst A | 520 | 500 | Not occurred | Present |
| Catalyst A | 520 | 550 | Occurred | None |
| Catalyst B | 440 | 450 | Not occurred | None |
| Catalyst B | 440 | 500 | Not occurred | None |
| Catalyst B | 440 | 550 | Occurred | None |
| Catalyst C | 360 | 380 | Not occurred | None |
| Catalyst C# | 330 | 340 | Not occurred | None |

: The two-dimensional component was provided.

As can be seen from Table 1, when the temperature was controlled to 500° C. or lower, cracks did not occur in trap 5. Moreover, when catalysts B and C were used, the particulates did not remain in trap 5.

Furthermore, the electric power consumed at the regeneration was measured when the heat insulating materials 8 and 9 were provided and when they were not provided. As a result, when they were provided, the consumption power was 0.16 kWh and when they were not provided, it was 0.20 kWh. By providing the heat insulating materials, the insulation effectiveness increases and the consumption power decreases.

As described above, the probability of generation of melting loss or occurrence of cracking or breaking of trap 5 can be markedly diminished by controlling the temperature used for burning the particulates deposited on the trap 5 to 500° C. or lower. That is, if the burning temperature exceeds 500° C., cracking or breaking of trap 5 sometimes occurs, but when it is controlled to 500° C. or lower, substantially no craking or breaking occurs.

Another example will be recited below.

In the above example, the probability of occurrence of cracking or breaking of trap 5 was diminished by controlling the temperature of the trap 5 per se not to exceed 500° C. when the particulates deposited on the trap 5 are burnt. In another example, the breaking or cracking of trap 5 is inhibited by controlling the temperature gradient in the radial direction of the trap 5. That is, even when the trap 5 is regenerated at 500° C. or lower, if the temperature gradient is great, cracking or breaking may occur (low in probability) and if the temperature gradient is small, cracking or breaking may not occur (low in probability).

Specifically, it is necessary that the temperature gradient in a radial direction is 10° C./mm or less when burning the particulates deposited on the trap 5. As a means to attain the above-mentioned temperature gradient, mention may be made of, for example, providing heaters at outside and inside of the trap 5 or using a burning system with hot air.

FIG. 4 is a comprehensive view of an experiment in which the temperature gradient of the trap was measured. Numeral 5 indicates a trap, 22 indicates an exhaust gas outlet face, and 20a indicates an exhaust gas inlet face. As shown in FIG. 4, thermocouples are linearly arranged at three points T1, T2, T3 at an interval of 22 mm in a radial direction at the exhaust gas inlet face 20a and, furthermore, the thermocouples are linearly arranged at three points T4, T5, T6 at an interval of 22 mm in a radial direction at a distance of 65 mm in a lengthwise direction from the inlet face 20a. In this case, T4, T5, T6 are arranged on a line which inclines at 1200 in respect to T1, T2, T3. Furthermore, the thermocouples are linearly arranged at three points T7, T8, T9 at an interval of 22 mm in a radial direction at a distance of 65 mm in a lengthwise direction from (T4, T5, T6). In this case, T7, T8, T9 are arranged on a line which inclines at 1200 in respect to T4, T5, T6.

The temperature differences between T1 and T2, T2 and T3, T4 and T5, T5 and T6, T7 and T8, and T8 and T9 are measured by the thermocouples arranged as mentioned above. The maximum temperature difference is measured in the case of the following samples and the maximum temperature difference is divided by 22 mm to obtain the temperature gradient. For example, if the temperature difference between T7 and T8 is the largest among the temperature differences measured and this is 220° C., the maximum temperature difference is as follows:

$$220° C. \div 22\ mm = 10° C./mm$$

Further, the degree of damage of trap 5 is shown by the reduction rate of the number of proper oscillation. A larger reduction rate of the number of proper oscillation means much that cracking or breaking has occurred.

As a result of this experiment, when the maximum temperature difference was 30° C./mm, the reduction rate of the number of proper oscillation was 40% and the trap 5 hardly fulfilled its function. Similarly, the reduction rate of the number of proper oscillation of trap 5 having a maximum temperature gradient of 15–20° C./mm was 10–20% and the characteristics of trap 5 deteriorated. Furthermore, when the maximum temperature difference was 10° C./mm or less, the reduction rate of the number of proper oscillation did not change.

As shown above, when the maximum temperature gradient is 10° C./mm or less, cracking or the like of the trap 5 does not occur.

In the most preferable example, substantially no cracking occurs by controlling the temperature at the time of burning the particulates deposited on trap 5 to 500° C. or lower and by controlling the burning so that the maximum temperature gradient is 10° C./mm or less.

As explained above, according to the present invention, it becomes possible to regenerate the trap after trapping of particulates without suffering from the damages such as cracking and melting loss. In addition, the energy required for regeneration can be reduced to the minimum and system efficiency can be improved. Thus, industrially very high effects can be obtained for the regeneration of the trap after trapping of particulates, which has been conventionally a problem.

Next, trap 5 will be explained in detail.

Trap 5 comprises a three-dimensional component (honeycomb component 20) provided with an oxidizing catalyst as mentioned above. The following explanation will be made mainly on the oxidizing catalyst.

As the materials of the three-dimensional component, there may be suitably used ceramics such as cordierite, mullite, alumina, silica, titania, zirconia, silica-alumina, alumina-zirconia, alumina-titania, silica-titania, silica-zirconia, and titania-zirconia, SUS-301S, and Inconel.

The inorganic layer comprises a porous body of a high specific surface area. As the materials thereof, there may be suitably used alumina, silica, titania, zirconia, silica-alumina, alumina-zirconia and alumina-titania which are ordinarily used as carrier substrates. These are unlimited.

The three-dimensional component is used for preparation of the supported catalyst. Furthermore, if necessary, an inorganic substrate is formed on the three-dimensional component by wash coating the above-mentioned materials. The wash coating is effected by a sol-gel method or by coating a slurry prepared using the powder of the substrate material. That is, according to the sol-gel method, an acid (such as hydrochloric acid, acetic acid or the like) is added to a solution containing an organic salt (alkoxide or the like) of a metal element constituting the inorganic substrate, to thereby adjust pH of the solution, then the three-dimensional component is impregnated and coated with the solution and is allowed to come into contact with water vapor or the like, whereby the solution is hydrolyzed to a sol and further gelled and, thereafter, the component is fired. In the case of using a slurry, a powder of the starting material is introduced into an aqueous solution in which a dispersant (such as a polycarboxylate) is previously dissolved and this is disintegrated into particles and mixed in a ball mill to prepare a slurry, in which a filter is immersed to coat the filter with the slurry, and then the filter is fired and shaped. Thereon are supported an element of Group 1B of the periodic table and at least one element of Groups 4A, 3B and 4B or these elements and additionally at least one element of Groups 4A, 3B and 4B and an element of Group 2A, excluding the platinum family element among the compositions of the catalyst group of this example. That is, these compounds are suspended in aqueous solutions or organic solvents such as an alcohol and the three-dimensional component is impregnated with the suspension to support the elements thereon or solutions are prepared using the water-soluble or organic solvent-soluble salts and the three-dimensional component is impregnated with the solution to support the elements thereon and, thereafter, the three-dimensional component is fired at 800–1000° C. Then, a compound containing at least one metal selected from platinum family elements such as platinum, rhodium and palladium is suspended in an aqueous solution or an organic solvent such as an alcohol and the three-dimensional component is impregnated with the suspension to support the metals thereon or a solution is prepared using a water-soluble or organic solvent-soluble compound and the three-dimensional component is impregnated with the solution to support the metals thereon and thereafter, the three-dimensional component is fired at 400–600° C.

It is also possible to first impregnate with an element of Group 1A and at least one element of Groups 4A, 3B and 4B exclusive of noble metals in the compositions of catalyst group of this example, then fire the three-dimensional component (800–1000° C.) and thereafter support the remainder elements and then the platinum family elements. Furthermore, it is also possible to previously fire and react an element of Group 1A and at least one element of Groups 4A, 3B and 4B, grind the product and then support the powder on the three-dimensional component.

Moreover, the three-dimensional component may be impregnated simultaneously with the inorganic substrate and the catalyst components and fired. That is, an acid such as hydrochloric acid or acetic acid and an aqueous solution of the compounds of the catalyst elements are added to a solution containing an organic salt such as an alkoxide of the metal element constituting the inorganic substrate and therein is immersed the three-dimensional component to coat the component with the solution and then, the coat is allowed to come into contact with water vapor or the like to convert the alkoxide to a sol by hydrolysis reaction, which is further converted to a gel and, thereafter, the three-dimensional component is subjected to the firing.

The starting compounds can be suitably selected from organic compounds, e.g., carboxylates such as acetates and formates and complex compounds and inorganic compounds such as oxides, nitrates, carbonates, phosphates, sulfates, metallic acid salts, halides and hydroxides. Preferred are those which are high in solubility in water, ethyl alcohol or the like.

The catalyst may be supported not only on the three-dimensional components, but also on pellet-like components.

EXAMPLE 1

Lithium acetate and aluminum nitrate were weighed at a molar ratio of the metal elements as shown in Table 2. Then, each of the thus weighed starting materials was dissolved in a distilled water of about 40° to prepare an aqueous solution. The resulting aqueous solutions were mixed and water was evaporated by a rotary evaporator to concentrate the metal salts, which were then dried and solidified on a hot plate. The products were mixed and ground in a ball mill for 4 hours and calcined at 400° C. for 5 hours and, furthermore, fired at 750° C. for 5 hours in a lidded crucible to obtain a precursor of the catalyst. Then, hexachloroplatinic acid weighed at 0.8 wt % based on the precursor was dissolved in distilled water of about 40° C. to prepare an aqueous solution. This aqueous solution was mixed with the precursor, and water in the aqueous solution was evaporated by a rotary evaporator to concentrate the mixture. Then, the mixture was dried and solidified on a hot plate. The products were mixed and ground in a ball mill for 4 hours and fired at 500° C. for 5 hours to prepare a catalyst.

TABLE 2

|  | Lithium | Aluminum |
|---|---|---|
| Sample-1 | 5 | 1 |
| Sample-2 | 3 | 1 |
| Sample-3 | 2 | 1 |
| Sample 4 | 2 | 1 |

EXAMPLE 2

A catalyst was prepared in the same manner as in Example 1, except that potassium acetate was used in place of the lithium acetate.

The molar ratio of potassium, aluminum and silica was potassium:aluminum=2:1. (Sample 2-1)

EXAMPLE 3

Lithium acetate, aluminum nitrate and copper acetate were weighed at a molar ratio of lithium: luminum:copper= 2:1:1. Then, each of the thus weighed starting materials was dissolved in distilled water of bout 40° C. to prepare an aqueous solution. The resulting aqueous solutions were mixed and water was evaporated by a rotary evaporator to concentrate the metal salts, which were then dried and solidified on a hot plate. The products were mixed and ground in a ball mill for 4 hours and calcined at 400° C. for 5 hours and, furthermore, fired at 750° C. for 5 hours in a lidded crucible to obtain a precursor of catalyst. Then, hexachloroplatinic acid weighed at 0.8 wt % based on the precursor was dissolved in distilled water of about 40° C. to prepare an aqueous solution. This aqueous solution was mixed with the precursor, and water in the aqueous solution was evaporated by a rotary evaporator to concentrate the mixture. Then, the mixture was dried and solidified on a hot plate. The products were mixed and ground in a ball mill for 4 hours and fired at 500° C. for 5 hours to prepare a catalyst. (Sample 3-1).

EXAMPLE 4

The desired catalysts were prepared in the same manner as in Example 3, except that copper acetate was replaced with chromium nitrate (Sample 4-1), iron acetate (Sample 4-2), cobalt acetate (Sample 4-3), cerium nitrate (Sample 4-4), lanthanum acetate (Sample 4-5), or ammonium vanadate (Sample 4-6).

EXAMPLE 5

Lithium acetate, magnesium acetate, aluminum nitrate and cerium nitrate were weighed at a molar ratio of lithium:magnesium:aluminum:cerium=1.6:0.2:1:1. Then, each of the thus weighed starting materials was dissolved in distilled water of about 40° C. to prepare an aqueous solution. The resulting aqueous solutions were mixed, and water was evaporated by a rotary evaporator to concentrate the metal salts, which were dried and solidified on a hot plate. The products were mixed and ground in a ball mill for 4 hours and calcined at 400° C. for 5 hours and furthermore, fired at 750° C. for 5 hours in a lidded crucible to obtain a precursor of catalyst. Then, hexachloroplatinic acid weighed at 0.8 wt % based on the precursor was dissolved in distilled water of about 40° C. to prepare an aqueous solution. This aqueous solution was mixed with the precursor and water in the aqueous solution was evaporated by a rotary evaporator to concentrate the mixture. Then, this was dried and solidified on a hot plate. The products were mixed and ground in a ball mill for 4 hours and fired at 500° C. for 5 hours to prepare a catalyst. (Sample 5-1).

EXAMPLE 6

Lithium acetate and aluminum nitrate were weighed at a molar ratio of lithium:aluminum=2:1. Then, each of the thus weighed starting materials was dissolved in distilled water of about 40° C. to prepare an aqueous solution. The resulting aqueous solutions were mixed and water was evaporated by a rotary evaporator to concentrate the metal salts, which were dried and solidified on a hot plate. The products were mixed and ground in a ball mill for 4 hours, calcined at 400° C. for 5 hours and fired at 900° C. for 5 hours in a lidded crucible. Furthermore, cerium nitrate was weighed at a molar ratio of said lithium and cerium being lithium:cerium=2:1 and dissolved in distilled water of about 40° C. to prepare an aqueous solution. The resulting aqueous solution was mixed with the above mixture of lithium and aluminum and water in the aqueous solution was evaporated by a rotary evaporator to concentrate the metal salts, which were dried and solidified on a hot plate. The products were mixed and ground in a ball mill for 4 hours and fired at 750° C. for 5 hours to obtain a precursor of catalyst. Then, hexachloroplatinic acid weighed at 0.8 wt % based on the precursor was dissolved in distilled water of about 40° C. to prepare an aqueous solution. This aqueous solution was mixed with the precursor, and water in the aqueous solution was evaporated by a rotary evaporator to concentrate the metal salts, which were dried and solidified on a hot plate. The products were mixed and ground in a ball mill for 4 hours and fired at 500° C. for 5 hours to prepare a catalyst. (Sample 6-1).

EXAMPLE 7

Lithium acetate, magnesium acetate, aluminum nitrate and cerium nitrate were weighed at a molar ratio of the metal elements of lithium:magnesium:aluminum=1.6:0.2:1. Then, each of the thus weighed starting materials was dissolved in distilled water of about 40° C. to prepare an aqueous solution. The resulting aqueous solutions were mixed and water was evaporated by a rotary evaporator to concentrate the metal salts, which were dried and solidified on a hot plate. The products were mixed and ground in a ball mill for 4 hours and calcined at 400° C. for 5 hours and furthermore, fired at 900° C. for 5 hours in a lidded crucible. Furthermore, cerium nitrate was weighed at a molar ratio of said aluminum and cerium being aluminum:cerium=1:1 and dissolved in distilled water of about 40° C. to prepare an aqueous solution. The resulting aqueous cerium solution was mixed with the above composite of lithium, magnesium and aluminum fired at 900° C. and water in the aqueous solution was evaporated by a rotary evaporator to concentrate the metal salts, which were dried and solidified on a hot plate. The products were mixed and ground in a ball mill for 4 hours and calcined at 400° C. for 5 hours and furthermore, fired at 750° C. for 5 hours to obtain a precursor of catalyst. Then, hexachloroplatinic acid weighed at 0.8 wt % based on the precursor was dissolved in distilled water of about 40° C. to prepare an aqueous solution. This aqueous solution was mixed with the precursor, and water in the aqueous solution was evaporated by a rotary evaporator to concentrate the mixture, which was dried and solidified on a hot plate. The products were mixed and ground in a ball mill for 4 hours and fired at 500° C. for 5 hours to prepare a catalyst. (Sample 7-1).

EXAMPLE 8

Lithium acetate was dissolved in distilled water of about 40° C. Alumina and silica were weighed so that the molar ratio of the metal elements in the aqueous lithium solution, alumina and silica was lithium:aluminum:silicon=2:1:1. These were mixed and water was evaporated on a hot plate and the residue was dried and solidified. The product was calcined at 400–500° C. for 2 hours, ground and mixed in a ball mill for 4 hours and then, fired at 750° C. for 5 hours to obtain a precursor. Then, hexachloroplatinic acid weighed at 0.8 wt % based on the precursor was dissolved in distilled water of about 40° C. to prepare an aqueous solution. This aqueous solution was mixed with the precursor, and water in the aqueous solution was evaporated by a rotary evaporator to concentrate the mixture. Then, the mixture was dried and solidified on a hot plate. The products were mixed and ground in a ball mill for 4 hours and fired at 500° C. for 5 hours to prepare a catalyst. (Sample 8-1).

EXAMPLE 9

A catalyst was prepared in the same manner as in Example 8, except that the molar ratio of lithium, aluminum and silicon was lithium:aluminum:silicon=2:2:3. (Sample 9-1).

EXAMPLE 10

A catalyst was prepared in the same manner as in Example 8, except that silica was replaced with zirconia (Sample 10-1) or titania (Sample 10-2).

EXAMPLE 11

Lithium acetate was dissolved in distilled water of about 40° C. Alumina and silica were weighed so that the molar ratio of lithium, aluminium and silicon was lithium:aluminum:silicon=2:1:1. These were mixed and water was evaporated on a hot plate and the residue was dried and solidified. The product was calcined at 400–500° C. for 2 hours, ground and mixed in a ball mill for 4 hours and then, fired at 750° C. for 5 hours to obtain a precursor. The precursor was introduced into an aqueous solution containing 0.5 wt % of ammonium carboxylate based on the precursor and disintegrated into particles and mixed in a ball mill for 18 hours to prepare a slurry. A ceramic filter was immersed in the slurry in a vacuum desiccator and bubbles in the filter were removed under reduced pressure to allow the slurry to penetrate into the filter. After shaking off the excess slurry, the filter was dried at 120° C. for 5 hours and fired at 800° C. for 2 hours. Then, hexachloroplatinic acid weighed at 0.8 wt % based on the precursor was dissolved in a distilled water of about 40° C. to prepare an aqueous solution. Then, the above filter having partially fired catalyst was immersed in this aqueous solution in a vacuum desiccator and bubbles in the filter was removed under reduced pressure to allow the catalyst solution to penetrate into the filter. This filter was dried by a microwave drier (output: 2 kW, time: 25 minutes) and fired at 500° C. for 2 hours to obtain the desired catalyst. The ceramic filter used above was prepared by forming sheets from an alumina-silica ceramic fiber ($Al_2O_3:SiO_2=47:53$) and sericite clay ($K_2O:Al_2O_3:SiO_2=1:5:18$) by paper making method, laminating the resulting flat sheets 1 and corrugated sheets 2 as shown, for example, in FIG. 1 to form a laminate having the corrugated honeycomb structure, and firing the honeycomb structure at 1250° C. for 2 hours. (Sample 11-1).

COMPARATIVE EXAMPLE 1

A catalyst was prepared in the same manner as in Example 1, except that aluminum nitrate was not used. (Sample 20-1).

COMPARATIVE EXAMPLE 2

A hexachloroplatinate in an amount of 0.8 wt % based on $\gamma$-$Al_2O_3$ was dissolved in a distilled water and in this solution was suspended $\gamma$-$Al_2O_3$ by an ultrasonic oscillator. The resulting suspension was dropped on a hot plate heated to 200° C. to dry the solvent. Then, the residue was fired at 500° C. for 1 hour in hydrogen to prepare a platinum-supporting $\gamma$-$Al_2O_3$. (Sample 20-2).

COMPARATIVE EXAMPLE 3

Lithium acetate was dissolved in distilled water of about 40° C. to prepare an aqueous lithium solution. In this aqueous solution was immersed the same filter as used in Example 9 in a vacuum desiccator and bubbles in the filter were removed under reduced pressure to allow the catalyst solution to penetrate into the filter. The filter was then dried by a microwave drier (output: 2 kW, time: 25 minutes) and fired at 750° C. for 2 hours to prepare the desired catalyst.

EXAMPLE 12

A sample obtained by physical mixing of catalyst with particulates contained in the exhaust gas from diesel engine in an amount of 20 wt % based on the catalyst was packed in a quartz reaction tube. The reaction tube was heated to 600° C. from room temperature at a heating rate of 5° C./min while passing therethrough a gas containing 10% of oxygen and the balance of nitrogen. From the gas after reaction was removed water produced by the burning of the particulates by a cooling trap. Thereafter, carbon monoxide and carbon dioxide were detected by an infrared gas analyzer and the burning temperature was measured from the peak of the amount of the generated gases.

The results on the catalysts of Examples 1–9 and Comparative Examples 1–2 are shown in Table 3.

TABLE 3

| Sample No. | Ignition temperature (° C.) | Sample No. | Ignition temperature (° C.) |
|---|---|---|---|
| Sample 1-1 | 321 | Sample 4-4 | 308 |
| Sample 1-2 | 339 | Sample 4-5 | 291 |
| Sample 1-3 | 345 | Sample 4-6 | 302 |
| Sample 1-4 | 356 | Sample 5-1 | 298 |
| Sample 2-1 | 361 | Sample 6-1 | 312 |
| Sample 3-1 | 340 | Sample 7-1 | 303 |
| Sample 4-1 | 327 | Sample 8-1 | 280 |
| Sample 4-2 | 347 | Sample 9-1 | 310 |
| Sample 4-3 | 335 | Sample 10-1 | 346 |
|  |  | Sample 10-2 | 348 |
|  |  | Sample 20-1 | 276 |
|  |  | Sample 20-2 | 427 |

EXAMPLE 13

After the catalyst was heat treated at 700° C. for 500 hours, the ignition temperature of the particulates was measured in the same manner as in Example 12.

The results on the catalysts of Examples 1–10 and Comparative Examples 1–2 are shown in Table 4.

TABLE 4

| Sample No. | Ignition temperature (° C.) | Sample No. | Ignition temperature (° C.) |
|---|---|---|---|
| Sample 1-1 | 372 | Sample 4-4 | 324 |
| Sample 1-2 | 363 | Sample 4-5 | 312 |
| Sample 1-3 | 359 | Sample 4-6 | 315 |
| Sample 1-4 | 366 | Sample 5-1 | 308 |
| Sample 2-1 | 378 | Sample 6-1 | 322 |
| Sample 3-1 | 358 | Sample 7-1 | 305 |
| Sample 4-1 | 342 | Sample 8-1 | 289 |
| Sample 4-2 | 363 | Sample 9-1 | 322 |
| Sample 4-3 | 349 | Sample 10-1 | 342 |
|  |  | Sample 10-2 | 349 |
|  |  | Sample 20-1 | 586 |
|  |  | Sample 20-2 | 452 |

EXAMPLE 14

After the catalyst was treated at 400° C. for 2000 hours with flowing therethrough a gas containing 900 ppm of $SO_2$, 5% of oxygen and the balance of nitrogen, the ignition temperature of particulates was measured in the same manner as in Example 12.

The results on the catalysts of Examples 1–10 and Comparative Examples 1–2 are shown in Table 5.

TABLE 5

| Sample No. | Ignition temperature (° C.) | Sample No. | Ignition temperature (° C.) |
|---|---|---|---|
| Sample 1-1 | 385 | Sample 4-4 | 339 |
| Sample 1-2 | 384 | Sample 4-5 | 324 |
| Sample 1-3 | 374 | Sample 4-6 | 326 |
| Sample 1-4 | 384 | Sample 5-1 | 327 |

TABLE 5-continued

| Sample No. | Ignition temperature (° C.) | Sample No. | Ignition temperature (° C.) |
|---|---|---|---|
| Sample 2-1 | 394 | Sample 6-1 | 332 |
| Sample 3-1 | 366 | Sample 7-1 | 319 |
| Sample 4-1 | 357 | Sample 8-1 | 305 |
| Sample 4-2 | 371 | Sample 9-1 | 332 |
| Sample 4-3 | 375 | Sample 10-1 | 366 |
|  |  | Sample 10-2 | 364 |
|  |  | Sample 20-1 | 546 |
|  |  | Sample 20-2 | 433 |

EXAMPLE 15

Trapping ability of the filter before supporting the catalyst and the catalyst-supporting filters of Example 12 and Comparative Example 3 were examined by introducing an exhaust gas from a diesel engine of a stroke volume of 2000 cc and four cylinders at 2500 rpm. (The trapping ability was calculated from the amounts of particulates at the inlet and outlet of the filter.) Furthermore, the ignition temperature of the particulates was examined in the same manner as in Example 12. Moreover, the filter subjected to the ignition test was again subjected to the trapping test and the ignition test repeatedly thirty times and the resulting ignition temperature was compared with the initial ignition temperature.

The results are shown in Table 6.

TABLE 6

|  | Trapping rate (%) | Burning temperature (1st) | Burning temperature (30th) |
|---|---|---|---|
| Sample 10-1 | 84 | 299 | 304 |
| Only the filter of Sample 10-1 | 81 | 613 | 612 |
| Sample 20-3 | 82 | 301 | 577 |

As shown above, in this example, the burning temperature of solid carbon fine particles or liquid or solid high molecular weight hydrocarbon fine particles contained in exhaust gases could be lowered by using the following oxidizing catalyst in the trap 5.

[1] An oxidizing catalyst comprising (a) a metal element of Group 1A, (b) a noble metal element and (c) at least one element of Groups 4A, 3B and 4B of the periodic table.

[2] An oxidizing catalyst comprising (a) a metal element of Group 1A, (b) a noble metal element, (c) at least one element of Groups 1B, 5A, 6A, 8A and rare earth elements, and (d) at least one element of Groups 4A, 3B and 4B.

[3] An oxidizing catalyst comprising (a) a metal element of Group 1A, (b) a noble metal element, (c) at least one element of Groups 4A, 3B and 4B, and (d) a metal element of Group 2A.

[4] An oxidizing catalyst comprising (a) a metal element of Group IA, (b) a noble metal element, (c) at least one element of Groups 1B, 5A, 6A and 8 and rare earth elements, (d) at least one element of Groups 4A, 3B and 4B, and (e) a metal element of Group 2A.

Other oxidizing catalysts will be explained below.

EXAMPLE 16

Figure 5:
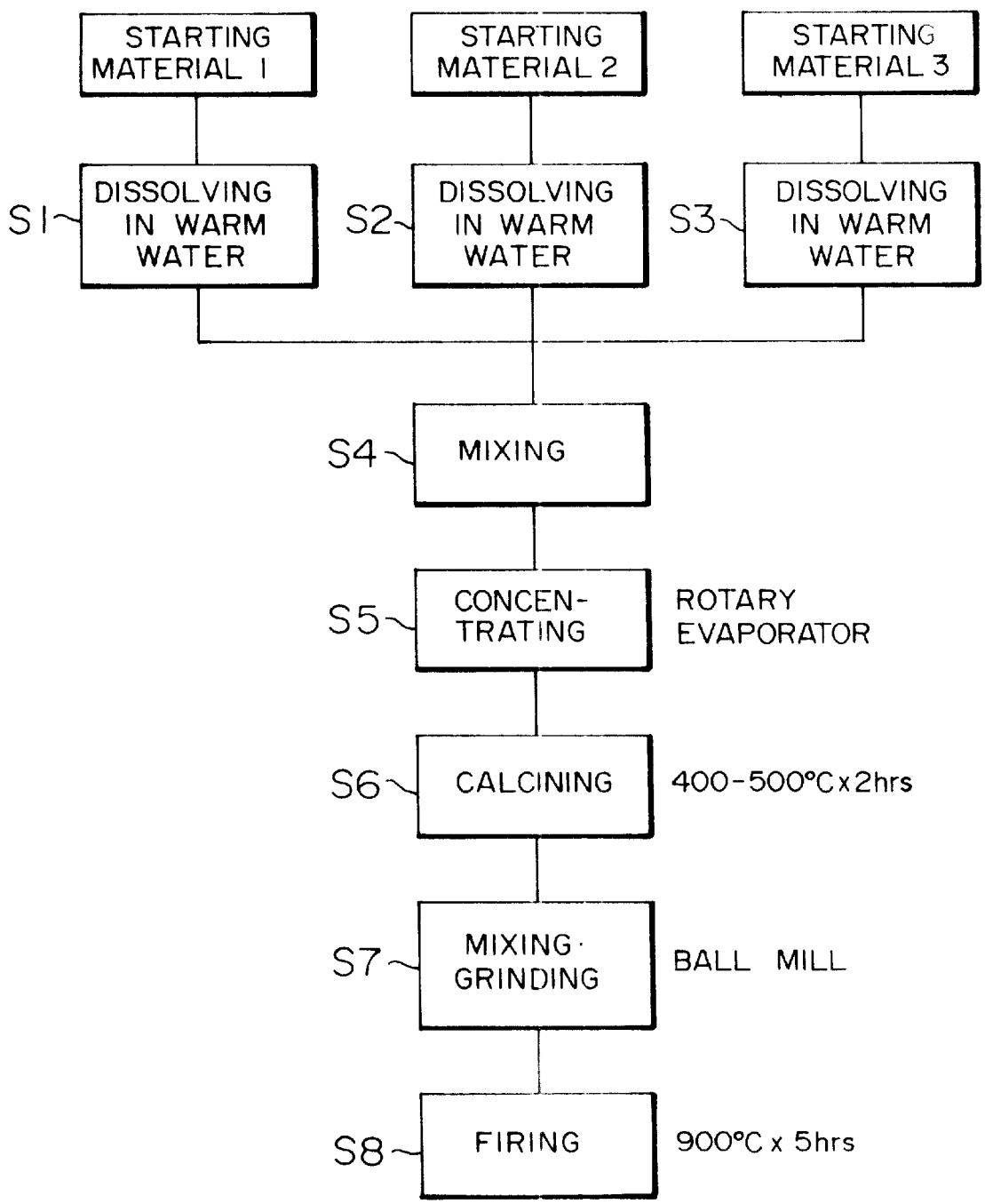
FIG. 5 is a flow chart which shows a process or preparation of an oxidizing catalyst according to one example of the present invention.

A process of preparing an exhaust gas purifying catalyst will be mentioned in detail referring to FIG. 5.

As the starting materials, lanthanum acetate, chromium nitrate and lithium acetate were weighed at a given molar ratio of the respective metals.

Then, each of the starting materials (lanthanum acetate as starting material 1, chromium nitrate as starting material 2, and lithium acetate as starting material 3) was dissolved in a warm water of about 60° C. to prepare aqueous solutions (S1, S2 and S3 in FIG. 5), and these solutions were mixed (S4). Then, water in the aqueous solution was evaporated by a rotary evaporator to concentrate the metal salts (S5). Thereafter, the metal salts were dried and solidified on a hot plate to prepare a precursor of an exhaust gas purifying catalyst. The precursor was calcined at 400–500° C. for 2 hours (S6), rotated for 4 hours in a ball mill in dry state to grind and mix the agglomerate (S7) and fired at 900° C. for 5 hours in the air (S8) to prepare the desired composite oxide fine powder.

In this example, for lanthanum and lithium, acetates thereof were used and for chromium, nitrate thereof was used as starting materials, but other salts such as sulfates may also be used as far as they are soluble in water. Furthermore, for stabilization of these metal ions, organic hydroxycarboxylic acids such as citric acid and others may be added.

Five samples differing in molar ratio were prepared in accordance with the above-mentioned process.

For each sample, the starting materials were weighed so as to obtain the molar ratio as shown in Table 7.

TABLE 7

| Sample No. | Lanthanum | Chromium | Lithium |
|---|---|---|---|
| Sample 31-1 | 1.0 | 0.9 | 0.1 |
| Sample 31-2 | 1.0 | 0.8 | 0.2 |
| Sample 31-3 | 1.0 | 0.7 | 0.3 |
| Sample 31-4 | 1.0 | 0.6 | 0.4 |
| Sample 31-5 | 1.0 | 0.5 | 0.5 |

EXAMPLE 17

The desired composite oxides were prepared in the same manner as in Example 16, except that lithium acetate was replaced with zinc acetate (Sample 32-1), copper acetate (Sample 32-2) or magnesium acetate (Sample 32-3). The compositional ratio was lanthanum:chromium:zinc (or copper or magnesium)=1.0:0.8:0.2.

EXAMPLE 18

Lanthanum hydroxide, chromium carbonate and vanadium oxide were weighed at a molar ratio of the metals of 1.0:0.8:0.2 and were introduced into an aqueous solution of a polycarboxylate in an amount of 0.5 wt % based on the whole weight. This was ground and mixed in a ball mill for 18 hours to prepare a slurry of the catalyst starting materials. Then, the solvent of this slurry was dried using a spray drier at an inlet temperature of 250° C. and a feeding rate of 50 ml/min and then, the residue was fired at 1000° C. for 3 hours in the air to prepare the desired composite oxide. The thus obtained sample was Sample 33-1.

EXAMPLE 19

Lanthanum acetate, chromium nitrate and chloroplatinate were weighed at a molar ratio of the respective metals of 1.0:0.95:0.05 (Sample 34-1) and 1.0:0.9:0.1 (Sample 34-2). Then, each of them was dissolved in a warm water of about 60° C. to prepare aqueous solutions. Then, water in the aqueous solution was evaporated by a rotary evaporator to concentrate the metal salts. Thereafter, the metal salts were dried and solidified on a hot plate to prepare a precursor of catalyst. The precursor was calcined at 400–500° C. for 2 hours, rotated for 4 hours in a ball mill in dry state to grind and mix the agglomerates and fired at 900° C. for 5 hours in the air to prepare the desired composite oxide fine powder.

EXAMPLE 20

Catalysts were prepared in the same manner as in Example 16 (FIG. 5), except that lanthanum acetate was used as the starting material 1, potassium acetate was used as the starting material 2 and chromium nitrate was used as the starting material 3.

In this example, for lanthanum and potassium, acetates thereof were used and for chromium, nitrate thereof was used as starting materials, but other salts such as sulfates may also be used as far as they are soluble in water.

Five samples differing in compositional ratio were prepared in accordance with the above-mentioned process. For each sample, the starting materials were weighed so as to obtain the molar ratio as shown in Table 8.

TABLE 8

| Sample No. | Lanthanum | Potassium | Chromium |
|---|---|---|---|
| Sample 35-1 | 0.9 | 0.1 | 1.0 |
| Sample 35-2 | 0.8 | 0.2 | 1.0 |
| Sample 35-3 | 0.7 | 0.3 | 1.0 |
| Sample 35-4 | 0.6 | 0.4 | 1.0 |
| Sample 35-5 | 0.5 | 0.5 | 1.0 |

EXAMPLE 21

As the starting materials, lanthanum acetate, strontium acetate, chromium nitrate, lithium acetate and chloroplatinate were weighed at a given molar ratio.

Then, each of the starting materials was dissolved in a warm water of about 60° C. to prepare aqueous solutions. Water in the aqueous solutions was evaporated by a rotary evaporator to concentrate the metal salts. Thereafter, the metal salts were dried and solidified on a hot plate to prepare a catalyst precursor. The precursor was calcined at 400–500° C. for 2 hours, rotated for 4 hours in a ball mill in dry state to grind and mix the agglomerate and fired at 900° C. for 5 hours in the air to prepare the desired composite oxide fine powder.

In this example, for lanthanum, strontium and lithium, acetates thereof were used, for chromium, nitrate thereof was used and for platinum, a chloride thereof was used as starting materials, but other salts such as sulfates may also be used as far as they are soluble in water.

Twelve samples differing in compositional ratio were prepared in accordance with the above-mentioned process. For each sample, the starting materials were weighed so as to obtain the molar ratio as shown in Table 9.

TABLE 9

| Sample No. | Lanthanum | Strontium | Chromium | Lithium | Platinum |
|---|---|---|---|---|---|
| Sample 36-1 | 0.8 | 0.2 | 0.5 | 0.4 | 0.1 |
| Sample 36-2 | 0.8 | 0.2 | 0.7 | 0.2 | 0.1 |
| Sample 36-3 | 0.8 | 0.2 | 0.6 | 0.3 | 0.1 |
| Sample 36-4 | 0.8 | 0.2 | 0.4 | 0.4 | 0.2 |
| Sample 36-5 | 0.8 | 0.2 | 0.55 | 0.4 | 0.05 |
| Sample 36-6 | 0.8 | 0.2 | 0.4 | 0.5 | 0.1 |
| Sample 36-7 | 0.8 | 0.2 | 0.3 | 0.4 | 0.3 |
| Sample 36-8 | 0.8 | 0.2 | 0.8 | 0.1 | 0.1 |
| Sample 36-9 | 0.9 | 0.1 | 0.7 | 0.2 | 0.1 |
| Sample 36-10 | 0.7 | 0.3 | 0.7 | 0.2 | 0.1 |
| Sample 36-11 | 0.6 | 0.4 | 0.7 | 0.2 | 0.1 |
| Sample 36-12 | 0.5 | 0.5 | 0.7 | 0.2 | 0.1 |

EXAMPLE 22

Lanthanum acetate, potassium acetate, chromium nitrate, lithium acetate and chloroplatinate were weighed at a molar ratio of the metals of 0.8:0.2:0.5:0.4:0.1, and each was dissolved in a warm water of about 60° C. to prepare aqueous solutions. Water in the aqueous solutions was evaporated by a rotary evaporator to concentrate the metal salts. Thereafter, the metal salts were dried and solidified on a hot plate to prepare a precursor of catalyst. The precursor was calcined at 400–500° C. for 2 hours and rotated for 4 hours in a ball mill in dry state to grind and mix the agglomerate and the powder was fired at 900° C. for 5 hours in the air to prepare the desired composite oxide fine powder.

In this example, for lanthanum, potassium and lithium, acetates thereof were used, for chromium, nitrate thereof was used and for platinum, chloride thereof was used as the starting materials, but other salts such as sulfates may also be used as far as they are soluble in water. The resulting sample is referred to as Sample 37-1.

EXAMPLE 23

Lanthanum acetate, potassium acetate, sodium acetate, chromium nitrate, lithium acetate and chloroplatinate were weighed at a molar ratio of the metals of 0.8:0.1:0.1:0.5:0.4:0.1, and each was dissolved in a warm water of about 60° C. to prepare aqueous solutions. Water in the aqueous solutions was evaporated by a rotary evaporator to concentrate the metal salts. Thereafter, the metal salts were dried and solidified on a hot plate to prepare a catalyst precursor. The precursor was calcined at 400–500° C. for 2 hours and rotated for 4 hours in a ball mill in dry state to grind and mix the agglomerate and the powder was fired at 900° C. for 5 hours in the air to prepare the desired composite oxide fine powder.

In this example, as starting materials, acetates were used for lanthanum, potassium, sodium and lithium, nitrate was used for chromium, and chloride was used for platinum, but other salts such as sulfates may also be used as far as they are soluble in water. The resulting sample is referred to as Sample 38-1.

EXAMPLE 24

Lanthanum acetate, strontium acetate, chromium nitrate, lithium acetate and chloroplatinate were weighed at a molar ratio of the metals of 0.8:0.2:0.5:0.4:0.1, and then, the desired composite oxide was prepared in the same manner as in Example 21. (Sample 39-1).

Figure 6:
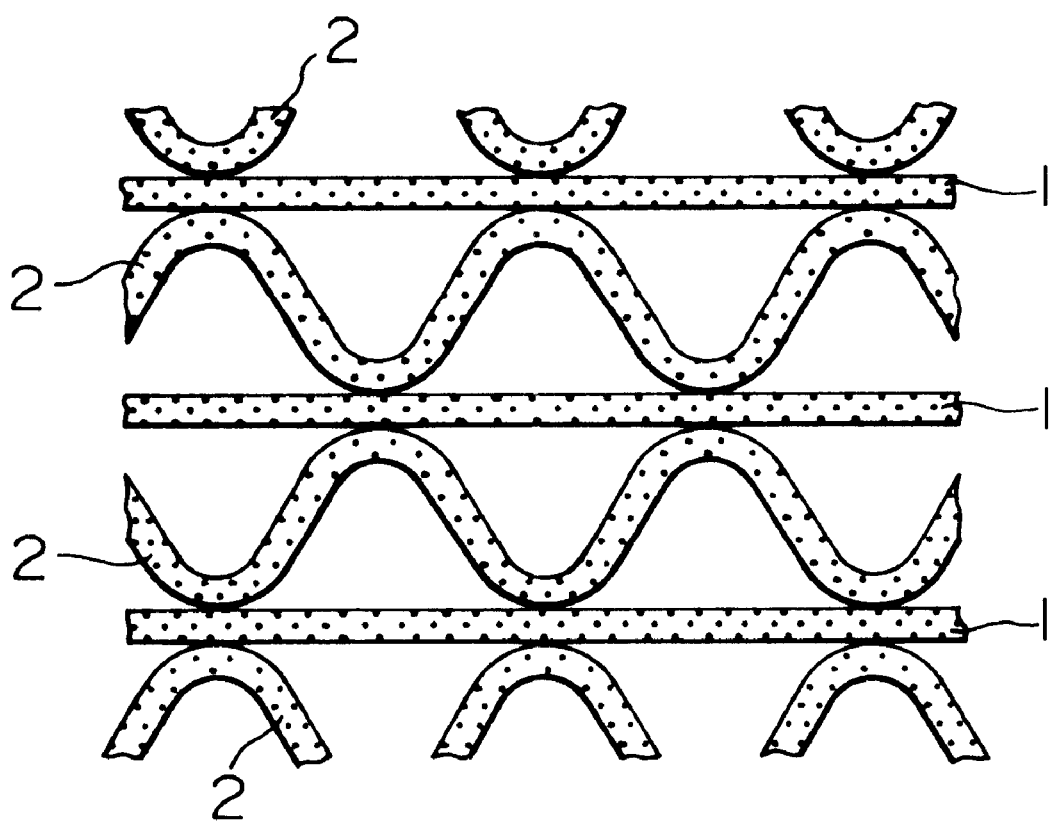
FIG. 6 is a partially enlarged view of a porous carrier which is an exhaust gas filter according to one example of the present invention.

A carrier was prepared by forming sheets from an alumina-silica ceramic fiber ($Al_2O_3/SiO_2=47.3/52.3$) and a sericite clay ($K_2O/Al_2O_3/SiO_2=1/5/18$) by paper making method, laminating the resulting flat sheets 1 and corrugated sheets 2 as shown, for example, in FIG. 6 to form a laminate having the corrugated honeycomb structure, and firing the laminate at 1250° C. for 2 hours in the air. The resulting carrier was a porous carrier.

Then, an aqueous solution was prepared by dissolving ammonium polycarboxylate as a dispersant in an amount of 0.4 wt % based on the composite oxide. To the resulting aqueous solution was added 30 wt % of the synthesized composite oxide, followed by mixing and dispersing for 15 hours in a ball mill to prepare a slurry of the composite oxide fine powder.

Separately, an aqueous solution was prepared by dissolving ammonium polycarboxylate at the same concentration as the concentration of the above slurry and the slurry was diluted with this aqueous solution. The porous carrier was immersed in the slurry, then, dried at 120° C. for the whole day and night, and fired at 800° C. for 20 minutes in the air to obtain an exhaust gas filter.

COMPARATIVE EXAMPLE 4

A hexachloroplatinate in an amount of 0.6 wt % based on $\gamma$-$Al_2O_3$ was dissolved in a distilled water and in this solution was suspended $\gamma$-$Al_2O_3$ by an ultrasonic oscillator. The resulting suspension was dropped on a hot plate heated to 200° C. to dry the solvent. Then, the residue was fired at 550° C. for 1 hour in hydrogen to prepare a platinum-supporting $\gamma$-$Al_2O_3$. (Sample 40-1).

COMPARATIVE EXAMPLE 5

Lanthanum acetate, strontium acetate and cobalt acetate were weighed at a molar ratio of the metals of 0.8:0.2:1.0, and each was dissolved in a warm water of about 60° C. to prepare aqueous solutions. Water in the aqueous solutions was evaporated by a rotary evaporator to concentrate the metal salts. Thereafter, the metal salts were dried and solidified on a hot plate to prepare a catalyst precursor. The precursor was calcined at 400–500° C. for 2 hours and rotated for 4 hours in a ball mill in dry state to grind and mix the agglomerate and the powder was fired at 850° C. for 5 hours in the air to prepare a perovskite type composite oxide represented by $La_{0.8}Sr_{0.2}CrO_3$ (Sample 40-2).

COMPARATIVE EXAMPLE 6

Lanthanum acetate and chromium acetate were weighed at a molar ratio of the metals of 1.0:1.0, and each was dissolved in a warm water of about 60° C. to prepare an aqueous solution. Water in the aqueous solution was evaporated by a rotary evaporator to concentrate the metal salts. Thereafter, the metal salts were dried and solidified on a hot plate to prepare a precursor of catalyst. The precursor was calcined at 400–500° C. for 2 hours and rotated for 4 hours in a ball mill in a dry state to grind and mix the agglomerate and the powder was fired at 950° C. for 5 hours in the air to prepare a perovskite type composite oxide represented by $LaCrO_3$ (Sample 40-3).

COMPARATIVE EXAMPLE 7

The same filter as used in Example 24 was immersed in an aqueous solution prepared by dissolving hexachloroplatinate in a distilled water, then dried at 120° C. for 10 hours and fired at 550° C. for 1 hour in hydrogen to support 500 mg/l of Pt (Sample 40-4).

COMPARATIVE EXAMPLE 8

Lanthanum acetate, strontium acetate, chromium nitrate, lithium acetate and chloroplatinate were weighed at a compositional ratio of the metals of 0.8:0.2:0.5:0.4:0.1, and then, the desired composite oxide was prepared in the same manner as in Example 6. A carrier was prepared by mixing a cordierite powder having an average particle size of 8 $\mu$m with a polyurethane resin as a binder in an amount of 50% based on the cordierite, molding the mixture, firing the molded product at 500–600° C. for 10 hours in the air to decompose and remove the binder and then firing it at 1200° C. for 1 hour in the air to make a porous carrier.

Then, an aqueous solution was prepared by dissolving ammonium polycarboxylate as a dispersant in an amount of 0.4 wt % based on the composite oxide. To the resulting aqueous solution was added 30 wt % of the synthesized composite oxide, followed by mixing and dispersing for 15 hours in a ball mill to prepare a slurry of the composite oxide powder.

Separately, an aqueous solution was prepared by dissolving ammonium polycarboxylate at the same concentration as the concentration of the above slurry and the slurry was diluted with the resultant aqueous solution. The cordierite carrier was immersed in the slurry, then, dried at 120° C. for the whole day and night, and fired at 800° C. for 20 minutes in the air to obtain a catalyst (Sample 40-5).

EXAMPLE 25

A sample obtained by physical mixing of catalyst with particulates contained in the exhaust gas from a diesel engine in an amount of 15 wt % based on the catalyst was packed in a quartz reaction tube. The reaction tube was heated to 800° C. from room temperature at a heating rate of 5° C./min while passing therethrough 10% oxygen-helium mixed gas at 100 ml/min. Carbon dioxide and water produced when particulates were burnt were adsorbed and trapped by a molecular sieve. Thereafter, amount of oxygen consumed was detected by gas chromatograph (TCD) and burning temperature was measured from the peak of the consumption amount of oxygen.

The results on the catalysts of Examples 16–23 and Comparative Examples 4–6 are shown in Table 10.

TABLE 10

| Sample No. | Burning temperature (° C.) | Sample No. | Burning temperature (° C.) |
|---|---|---|---|
| Sample 31-1 | 355 | Sample 36-1 | 279 |
| Sample 31-2 | 295 | Sample 36-2 | 288 |
| Sample 31-3 | 307 | Sample 36-3 | 305 |
| Sample 31-4 | 311 | Sample 36-4 | 293 |
| Sample 31-5 | 405 | Sample 36-5 | 285 |
| Sample 32-1 | 330 | Sample 36-6 | 352 |
| Sample 32-2 | 314 | Sample 36-7 | 377 |
| Sample 32-3 | 327 | Sample 36-8 | 388 |
| Sample 33-1 | 319 | Sample 36-9 | 304 |
| Sample 34-1 | 383 | Sample 36-10 | 307 |
| Sample 34-2 | 355 | Sample 36-11 | 324 |

TABLE 10-continued

| Sample No. | Burning temperature (° C.) | Sample No. | Burning temperature (° C.) |
|---|---|---|---|
| Sample 35-1 | 340 | Sample 36-12 | 391 |
| Sample 35-2 | 309 | Sample 37-1 | 286 |
| Sample 35-3 | 318 | Sample 38-1 | 297 |
| Sample 35-4 | 332 | Sample 40-1 | 526 |
| Sample 35-5 | 381 | Sample 40-2 | 540 |
|  |  | Sample 40-3 | 511 |

EXAMPLE 26

Exhaust gas from a four-cylinder diesel engine of 2000 cc in stroke volume was introduced into the filters of Example 24 and Comparative Examples 7 and 8 and the filter of Example 24 before supporting the catalyst thereon, and trapping ability (calculated from the amount of fine particles at the inlet and outlet of the filter) were determined at 2500 rpm and the ignition temperature of particulates after heating was measured in the same manner as in Example 16.

The results are shown in Table 11.

TABLE 11

| Sample No. | Trapping rate (%) | Burning temperature (° C.) |
|---|---|---|
| Sample 39-1 | 83 | 302 |
| Only the filter of Sample 39-1 | 80 | 613 |
| Sample 40-4 | 81 | 540 |
| Sample 40-5 | 45 | 304 |

As shown above, the oxidizing catalysts of this example are superior in heat resistance in a high temperature area and high in activity at low temperatures and are very useful.

Thus, the following effects can be obtained by using as an oxidizing catalyst a composite oxide having the composition of a perovskite type oxide represented by $LaCrO_3$ high in heat stability in which a part of La is replaced with K or a part of Cr is replaced with Li, Cu, Mg, Zn, V and at least one noble metal, or a part of La is replaced with an alkali metal or an alkaline earth metal and a part of Cr is replaced with Li, Cu, Mg, Zn, V and at least one noble metal.

(1) By replacing a part of La or a part of Cr or a part of La and Cr of a perovskite type oxide represented by $LaCrO_3$ with at least one suitable metal in a suitable amount, the burning temperature of fine particle substances (solid carbon fine particles, liquid or solid high molecular weight hydrocarbon fine particles) contained in exhaust gases can be lowered. By using the catalysts of high activity of the present invention, it becomes possible to burn the fine particle substances in exhaust gases at the exhausting temperatures without using a special apparatus.

(2) By supporting the above catalyst on a three-dimensional structure body having gas filter function, the fine particles in the exhaust gas can be trapped even under idling conditions of low exhausting temperatures and the trapped fine particles can be burnt and removed by the catalyst in the filter with rising of the exhaust gas at the time of load operation.

(3) By providing a three-dimensional structure body supporting low temperature catalysts and a heating means for heating the three-dimensional structure body, the fine particle substances can be sufficiently burnt even when the exhausting temperature is low.

What is claimed is:

1. A method for purification of an exhaust gas which contains particulates, said method comprising:
   (a) passing the exhaust gas through a trap to deposit the particulates on the trap, and
   (b) burning the particulates deposited on the trap by heating the trap, wherein, across an entire longitudinal axis of said trap during said burning step, the maximum temperature of the trap during the burning step is 500° C. and the maximum temperature gradient from the center of the cross section of the trap to the periphery of the cross section of the trap is 10° C./mm or less between points spaced 22 mm apart.

2. A method according to claim 1, wherein said trap comprises a catalyst.

3. A method according to claim 2, wherein an oxidizing catalyst is supported on the trap, said trap comprising a three-dimensional component, a porous inorganic layer provided on the three-dimensional component and an oxidizing catalyst deposited on the porous inorganic layer.

4. A method according to claim 3, wherein the oxidizing catalyst comprises (a) a metal element of Group 1A, (b) a metal element of platinum family and (c) at least one element of Groups 4A, 3B and 4B of the periodic table.

5. A method according to claim 4, wherein the Group 1A metal is selected from the group consisting of K and Li.

6. A method according to claim 3, wherein the oxidizing catalyst comprises (a) a metal element of Group 1A, (b) a metal element of platinum family, (c) at least one element of Groups 1B, 5A, 6A and 8 and rare earth elements, and (d) at least one element of Groups 4A, 3B and 4B of the periodic table.

7. A method according to claim 6, wherein the Group 1A metal is selected from the group consisting of K and Li.

8. A method according to claim 3, wherein the oxidizing catalyst comprises (a) a metal element of Group 1A, (b) a metal element of platinum family, (c) at least one element of Groups 1B, 5A, 6A and 8 and rare earth elements, (d) at least one element of Groups 4A, 3B and 4B, and (e) a metal element of Group 2A of the periodic table.

9. A method according to claim 8, wherein the Group 1A metal is selected from the group consisting of K and Li.

10. A method according to claim 3, wherein the oxidizing catalyst comprises a composite oxide type oxide $LaCrO_3$ in which Cr is partially replaced with at least one of Li, Cu, Mg, Zn, V and noble metals.

11. A method according to claim 10, wherein the oxidizing catalyst comprises a composite oxide of $LaCro_3$ in which La is partially replaced with at least one of alkaline earth metals and alkali metals.

12. A method according to claim 11, wherein the oxidizing catalyst comprises a composite oxide of $LaCrO_3$ in which La is partially replaced with a substituent selected from the group consisting of Sr, K, and a composite of Na and K, and Cr is partially replaced with a substituent selected from the group consisting of Li, and Li and at least one noble metal.

13. A method according to claim 12 wherein the substituent partially replacing La is present in an amount of 40 mol % or less., and the substituent partially replacing Cr is present in an amount of from 5–60 mol %.

14. A method according to claim 3, wherein the oxidizing catalyst is an oxide comprising metal elements of La, Sr, Cr. Li and Pt and the ratio of the elements is 1−x:x:1−6−z:y:z in which $0.1 \leq 0.4$, $0.2 \leq 0.4$, $0.05 \leq 0.2$, and $y+z \leq 0.5$.

15. A method according to claim 1, wherein the trap without a catalyst is used.

16. A method according to claim 1, wherein a ceramic honeycomb component is used as the trap.

17. A method for purification of an exhaust gas which contains particulates, said method comprising:
   (a) passing the exhaust gas through a trap to deposit the particulates on the trap,
   (b) interrupting the flow of exhaust gas through the trap, and
   (c) burning the particulates deposited on the trap by heating the trap by a heating means, wherein, across an entire longitudinal axis of said trap during said burning step, the maximum temperature of the trap during the burning step is 500° C. and the maximum temperature gradient from the center of the cross section of the trap to the periphery of the cross section of the trap is 10° C./mm or less between.

18. A method according to claim 17, wherein the maximum temperature of the trap and the maximum temperature gradient are controlled by a controlling means for controlling an amount of energy to be supplied to the heating means.

19. A method according to claim 18, wherein the controlling means controls the energy to be supplied to the heating means in accordance with outputs of a pressure sensor and out put of a temperature sensor.

* * * * *